(12) United States Patent
Fukunaga et al.

(10) Patent No.: US 8,432,082 B2
(45) Date of Patent: Apr. 30, 2013

(54) ARMATURE AND MOTOR

(75) Inventors: Keisuke Fukunaga, Kyoto (JP); Masato Aono, Kyoto (JP)

(73) Assignee: Nidec Corporation, Kyoto (JP)

( * ) Notice: Subject to any disclaimer, the term of this patent is extended or adjusted under 35 U.S.C. 154(b) by 177 days.

(21) Appl. No.: 13/075,205

(22) Filed: Mar. 30, 2011

(65) Prior Publication Data
US 2011/0241474 A1  Oct. 6, 2011

(30) Foreign Application Priority Data

Mar. 31, 2010  (JP) ................. 2010-080788

(51) Int. Cl.
*H02K 3/34* (2006.01)
(52) U.S. Cl.
USPC ........................................ 310/215; 310/214
(58) Field of Classification Search .......... 310/215, 310/214, 43
See application file for complete search history.

(56) References Cited

U.S. PATENT DOCUMENTS

| | | | |
|---|---|---|---|
| 5,698,923 A * | 12/1997 | Scherzinger et al. | 310/194 |
| 8,035,268 B2 * | 10/2011 | Okuyama et al. | 310/215 |
| 8,076,819 B2 * | 12/2011 | Taema | 310/215 |
| 2007/0222324 A1 * | 9/2007 | Fukui et al. | 310/215 |

FOREIGN PATENT DOCUMENTS

| | | |
|---|---|---|
| JP | 2001-008395 A | 1/2001 |
| JP | 2002-171704 A | 6/2002 |
| JP | 2007-252031 A | 9/2007 |

* cited by examiner

*Primary Examiner* — Nguyen N Hanh
(74) *Attorney, Agent, or Firm* — Keating & Bennett, LLP

(57) ABSTRACT

An armature includes a core-back, insulator members, coils and insulating sheets. The insulating sheets are arranged between the coils adjacent to one another. Each of the insulator members includes a flange-shaped inner wall portion positioned radially inwards of each of the insulating sheets. The inner wall portions of the insulator members adjacent to each other include opposing portions opposed to each other in a radially spaced-apart contactless relationship.

9 Claims, 11 Drawing Sheets

ARMATURE AND MOTOR

BACKGROUND OF THE INVENTION

1. Field of the Invention

The present invention relates to an armature and a motor.

2. Description of the Related Art

During the manufacturing of an armature, it is sometimes the case that an insulation film covering the outer circumference of an electrically conductive line is stripped off when the conductive line is wound around individual teeth. Thus, a motor including such an armature may fail to have sufficient electrical insulation between adjacent coils because of the stripped off insulation film. In view of this, an attempt has been made in, e.g., Japanese Patent Application Publication No. 2002-171704, to insert an insulating paper sheet between windings of neighboring phases in an effort to secure interphase electric insulation.

Despite the insertion of the insulating paper sheet, however, the insulating paper sheet may sometimes move from the inner circumferential surface of a stator to the center axis of the motor. This movement of the insulating paper then makes it impossible to secure electric insulation between windings of neighboring phases.

SUMMARY OF THE INVENTION

In accordance with a preferred embodiment of the present invention, an armature includes an annular core-back arranged in a concentric relationship with a center axis; a plurality of circumferentially spaced-apart teeth extending from the core-back toward the center axis; insulator members arranged to cover the teeth; coils including electrically conductive lines wound around the insulator members; and insulating sheets arranged between the coils adjacent to one another; wherein each of the insulator members includes a flange-shaped inner wall portion positioned radially inwards of each of the insulating sheets, the inner wall portions of the insulator members adjacent to each other including opposing portions opposed to each other in a radially spaced-apart contactless relationship.

With such configuration, it is possible to provide sufficient electric insulation between the adjacent coils because the insulating sheets are held against movement from the inner circumferential surface of the armature to the center axis of the motor.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Hereinafter, preferred embodiments of the present invention will now be described with reference to the accompanying drawings. The following description of the preferred embodiments of the present invention is provided for illustrative purposes only and is not intended to limit the scope of the present invention or the applications and uses thereof.

Figure 1:
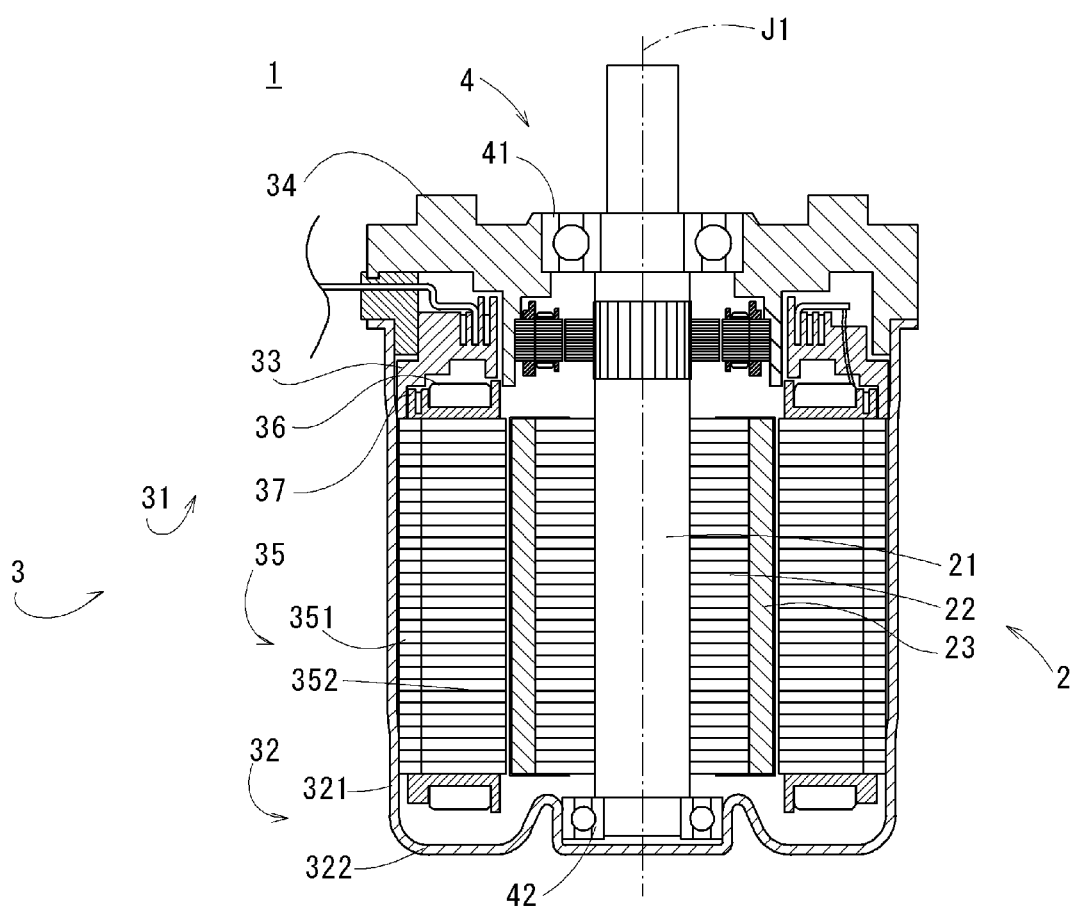
FIG. 1 is a section view schematically showing a motor according to a first preferred embodiment of the present invention.

FIG. 1 is a section view schematically showing a motor according to a first preferred embodiment of the present invention. As shown in FIG. 1, the motor 1 preferably includes a rotary unit 2, a stationary unit 3, and a bearing mechanism 4.

The rotary unit 2 preferably includes a shaft 21, a rotor core 22, and a plurality of rotor magnets 23. The shaft 21 preferably has a substantially cylindrical columnar shape and is arranged in a coaxial or substantially coaxial relationship with a center axis J1 of the motor. The rotor core 22 is preferably fixed to the outer circumferential surface of the shaft 21. The rotor core 22 is preferably formed by laminating flat magnetic steel plates one above another in an axial direction. However, any other desirable type of rotor core could be used. The rotor magnets 23 are fixed to the outer circumferential surface of the rotor core 22 so that N-poles and S-poles can be alternately arranged in a circumferential direction.

The stationary unit 3 preferably includes an armature 31, a housing 32, a bus bar unit 33 and a bracket 34. The armature 31 is arranged in a radially opposing relationship with the outer circumferential surfaces of the rotor magnets 23. The armature 31 preferably includes an armature core 35, coils 36 and insulator members 37. The armature core 35 is preferably formed by laminating magnetic steel plates one above another in the axial direction. However, any other desirable type of armature core could be used. The coils 36 are preferably formed by winding electrically conductive wires around the armature core 35. The insulator members 37 are preferably made of, e.g., a resin material, and are interposed between the armature core 35 and the coils 36 to electrically insulate the armature core 35 and the coils 36 from each other. The housing 32 preferably includes a cylinder portion 321 arranged to hold the armature 31 in place and a bottom portion 322 arranged to cover the armature 31 and the rotor core 22 at one axial end side. The bus bar unit 33 serves to electrically interconnect the armature 31 and a control device (not shown). The bus bar unit 33 is arranged to cover at least a portion of the armature 31 at the other axial side. With this configuration, insulating sheets 5 to be described in greater detail later are prevented from moving in the other axial direction beyond the other axial end surface of the armature 31. The bracket 34 covers the armature 31, the rotor core 22 and the bus bar unit 33 at the other axial end side.

The bearing mechanism 4 preferably includes two axially spaced-apart ball bearings 41 and 42. The ball bearing 41 is fixed to the bracket 34 while the ball bearing 42 is fixed to the bottom portion 322 of the housing 32. The shaft 21 is rotatably supported by the bracket 34 and the housing 32 through the ball bearings 41 and 42.

Figure 2:
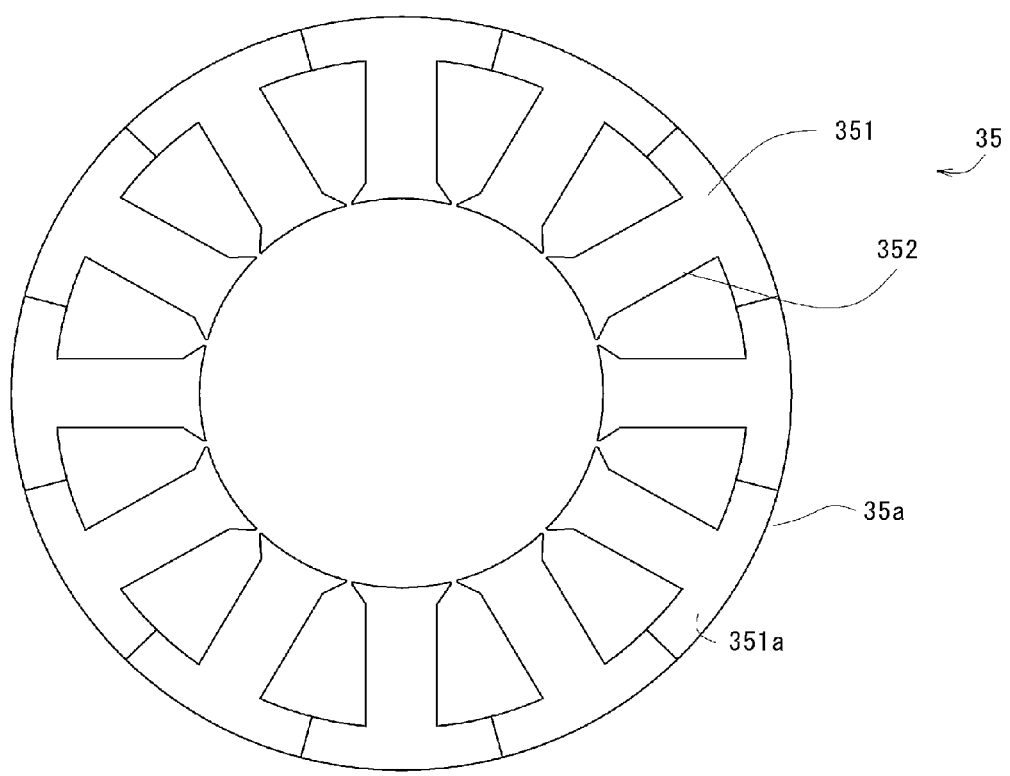
FIG. 2 is a view schematically showing the upper surface of an armature core.

FIG. 2 is a schematic top view showing the armature core 35. As shown in FIG. 2, the armature core 35 preferably includes a substantially annular core-back 351 and a plurality of teeth 352 extending from the core-back 351 toward the center axis J1. The armature core 35 is preferably formed by combining a plurality of separately defined armature elements 35*a* in the circumferential direction. Each of the armature elements 35*a* preferably includes a substantially arc-shaped core-back element 351*a* extending circumferentially about the center axis J1 and a tooth 352 extending from the core-back element 351*a* toward the center axis J1. The core-back element 351*a* and the tooth 352 are formed into a single piece. The core-back 351 is preferably formed by combining all the core-back elements 351*a* of the plurality of separately defined armature elements 35*a* together to define a ring shape.

Figure 3:
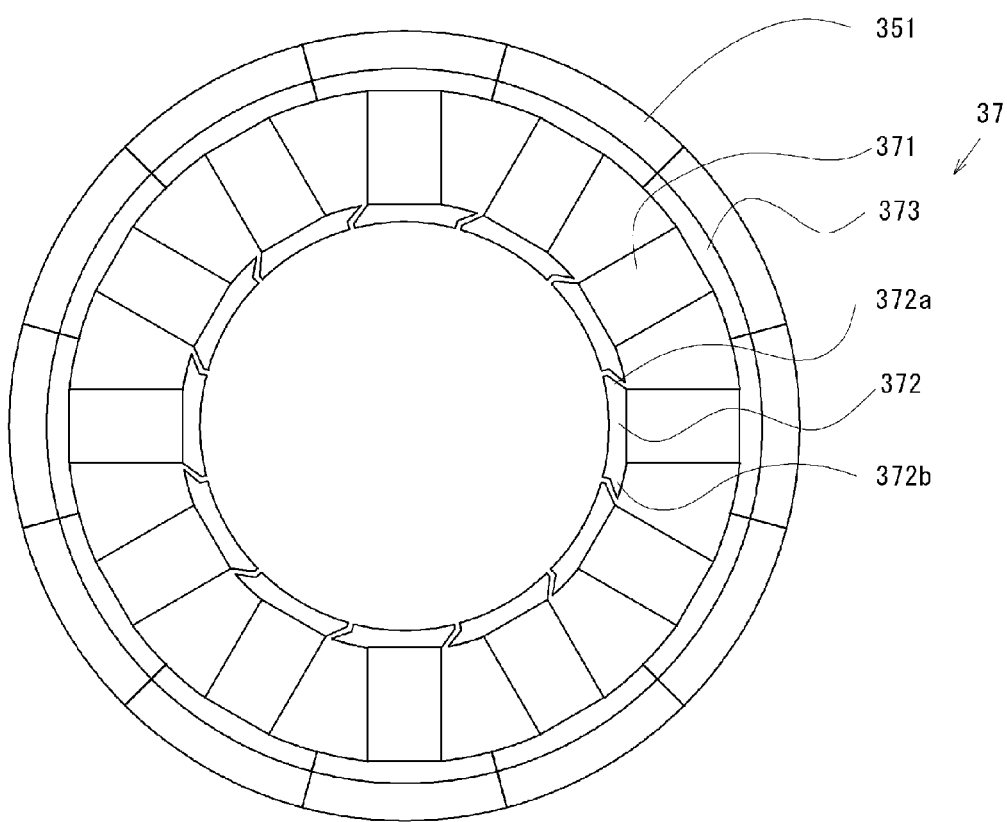
FIG. 3 is a view schematically showing the upper surface of the armature core mounted with insulator members.
Figure 4:
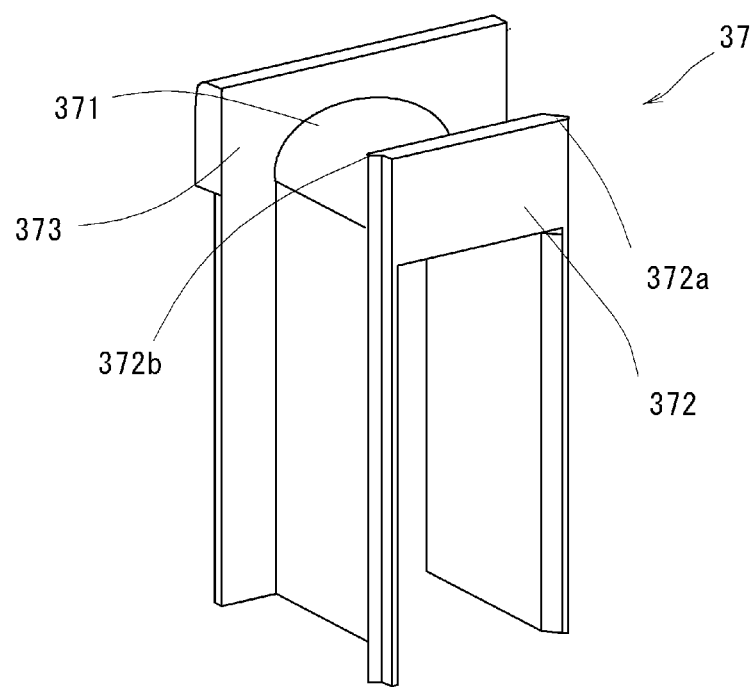
FIG. 4 is a perspective view schematically showing one of the insulator members.

FIG. 3 is a schematic top view showing the armature core 35 mounted with the insulator members 37. FIG. 4 is a perspective view schematically showing one of the insulator members 37. As shown in FIG. 3, each of the insulator members 37 is mounted to the corresponding one of the teeth 352. As can be seen in FIGS. 3 and 4, each of the insulator members 37 preferably includes a saddle-shaped body portion 371, a flange-shaped inner wall portion 372 and a flange-shaped outer wall portion 373. The body portion 371 is preferably arranged to cover each of the teeth 352. The inner wall portion 372 and the outer wall portion 373 are provided in the inner and outer edges of the body portion 371. The inclusion of the inner wall portion 372 and the outer wall portion 373 makes it possible to prevent the windings of electrically conductive wires positioned near the inner and outer edges of each of the teeth 352 from being collapsed in the radial direction.

The inner wall portion 372 preferably includes opposing portions 372*a* and 372*b* at the circumferential opposite ends. The opposing portion 372*a* has a tapered shape with a radial width which gradually decreases toward the tip end. The opposing portion 372*b* has a stepped shape provided with a step and a tapered shape with a radial width which gradually increases toward the tip end. The opposing portions 372*a* and 372*b* are defined over the full axial length of each of the insulator members 37.

As shown in FIG. 3, the opposing portions 372*a* and 372*b* of the mutually adjacent insulator members 37 are opposed to each other in a radially and circumferentially spaced-apart relationship. In other words, the opposing portions 372*a* and 372*b* adjacent to each other do not make direct contact with each other. Accordingly, use of the insulator members 37 of the present preferred embodiment makes it possible to secure circularity of the armature core 35 and to prevent the below-mentioned insulating sheets 5 from moving toward the center axis J1 away from the inner circumferential surface of the armature 31.

Two insulator members 37 identical in shape with each other are mounted to each of the teeth 352 at opposing upper and lower axial end sides thereof. At the midpoint of the axial length of each of the teeth 352, an axial end surface of the opposing portion 372*a* of the insulator member 37 inserted at a first one of the upper and lower axial end sides is opposed to, and comes into contact with, an axial end surface of the opposing portion 372*b* of the insulator member 37 inserted at the other one of the upper and lower axial end sides.

Figure 5A:
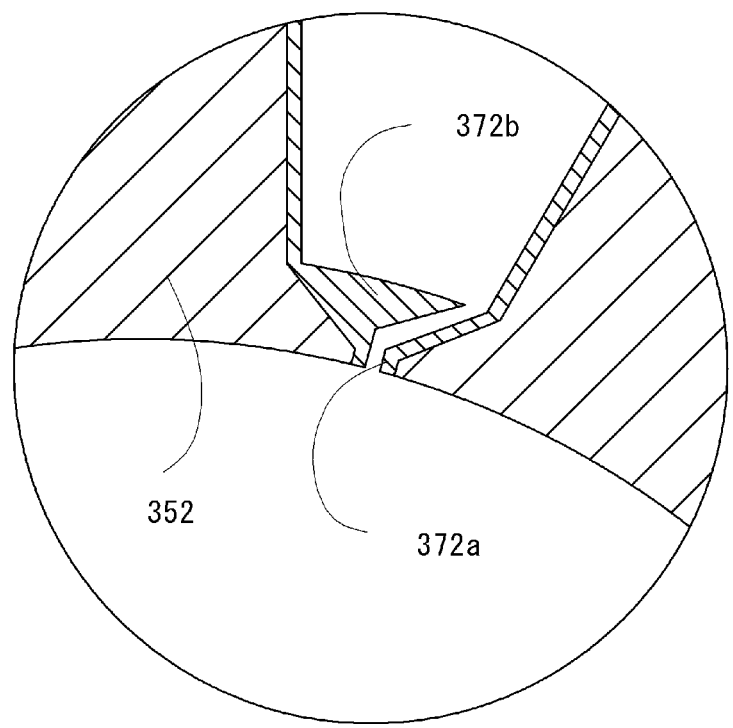
FIG. 5A is a section view schematically showing the adjacent armature elements and the insulator members, which view is taken along a plane deviated to one axial side from the midpoint of the axial length of the armature elements.
Figure 5B:
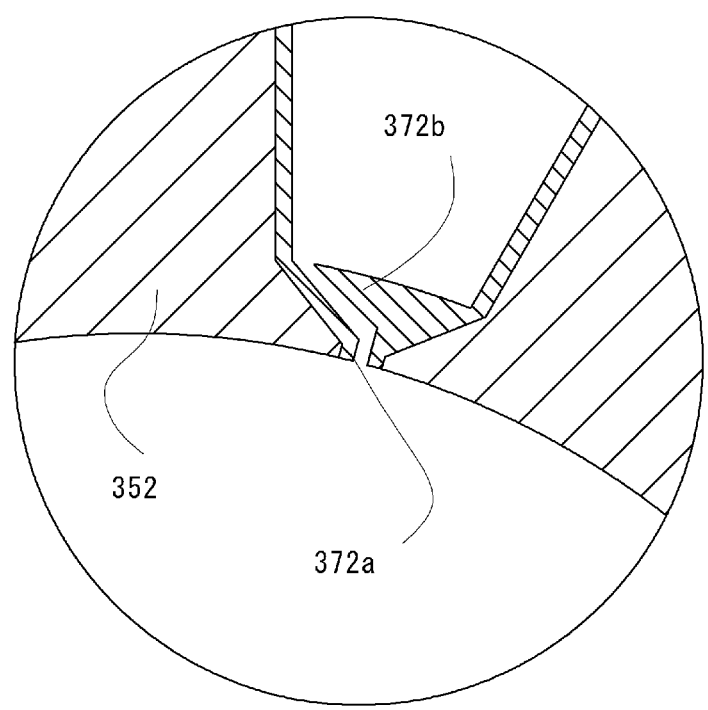
FIG. 5B is a section view schematically showing the adjacent armature elements and the insulator members, which view is taken along a plane deviated to the other axial side from the midpoint of the axial length of the armature elements.

FIG. 5A is a section view schematically showing the adjacent armature elements 35*a* and the insulator members 37, which view is taken along a plane offset to one axial side from the midpoint of the axial length of the armature elements 35*a*. FIG. 5B is a section view schematically showing the adjacent armature elements 35*a* and the insulator members 37, which view is taken along a plane offset to the other axial side from the midpoint of the axial length of the armature elements 35*a*. As shown in FIG. 5A, the opposing portion 372*a* of one of the insulator members 37 and the opposing portion 372*b* of the other insulator member 37 adjacent thereto are opposed to each other at one axial side offset from the midpoint of the axial length of the armature elements 35*a*. In contrast, as shown in FIG. 5B, the opposing portion 372*b* of one of the insulator members 37 and the opposing portion 372*a* of the other insulator member 37 adjacent thereto are opposed to each other at the other axial side offset from the midpoint of the axial length of the armature elements 35*a*. This means that the mutually adjacent opposing portions 372*a* and 372*b* have different opposing shapes at the axial opposite ends. This configuration makes it difficult for the below-mentioned insulating sheets 5 to move from the inner circumferential surface of the armature 31 toward the center axis J1 of the motor 1.

Figure 6:
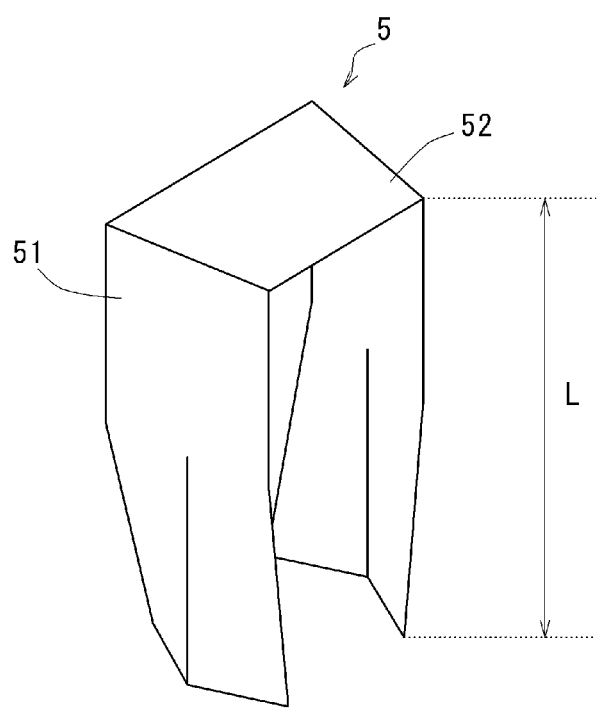
FIG. 6 is a view schematically showing one of insulating sheets.

FIG. 6 is a view schematically showing one of insulating sheets 5. As shown in FIG. 6, each of the insulating sheets 5 is substantially U-shaped and preferably includes two longitudinal portions 51 and one transverse portion 52

Figure 7:
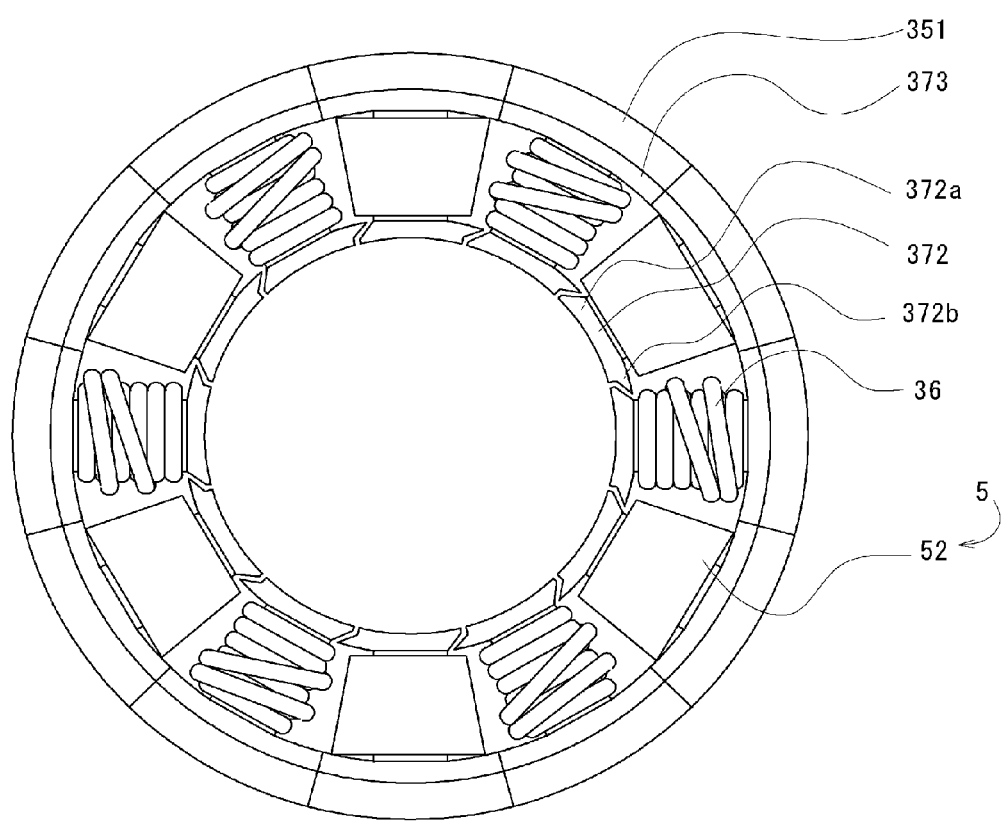
FIG. 7 is a view schematically showing the upper surface of an armature with the insulating sheets arranged therein.

FIG. 7 is a schematic top view showing the armature 31 with the insulating sheets 5 arranged therein. As shown in FIG. 7, a plurality of the insulating sheets 5 are provided, the longitudinal portions 51 of each of the insulating sheets 5 being arranged between the adjacent coils 36. The transverse portion 52 of each of the insulating sheets 5 covers the other axial end of each of the coils 36. Each of the insulating sheets 5 is arranged radially outwards of the inner wall portion 372 of each of the insulator members 37. Since the opposing portions 372*a* and 372*b* of the adjacent insulator members 37 are opposed to each other in a radially spaced-apart relationship, the insulating sheets 5 do not move from the inner circumferential surface of the armature 31 toward the center axis J1. Accordingly, it is possible to secure electric insulation between the mutually-adjacent coils 36.

The gaps between the mutually-adjacent coils 36 will be referred to as "slots" herein below. The number of the slots is equal to the number of the teeth 352. This means that the number of the insulating sheets 5 is preferably equal to one half of the number of the teeth 352. Accordingly, the number of the insulating sheets 5 can be reduced by using the insulating sheets 5 of the present preferred embodiment.

The length L of the longitudinal portions 51 of each of the insulating sheets 5 is preferably greater than the axial dimension of the teeth 352. In other words, the opposing surfaces of the coils 36 opposed to the adjacent coils 36 face the insulating sheets 5 for the most part. Therefore, use of the insulating sheets 5 makes it possible to secure electric insulation between the mutually-adjacent coils 36.

The insulating sheets 5 are bent along the longitudinal direction thereof (see FIG. 6). Thus, the insulating sheets 5 are widened in the circumferential direction and are hard to move within the slots. Accordingly, the insulating sheets 5 of this configuration are hard to move from the inner circumferential surface of the armature 31 toward the center axis J1, as compared with insulating sheets that do not include any bending portions. Alternatively, the insulating sheets 5 may be curved rather than bent if so desired.

Figure 8:
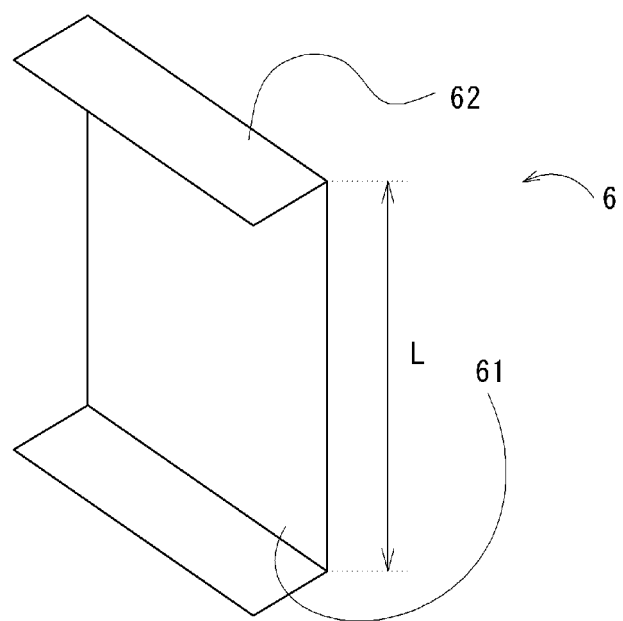
FIG. 8 is a view schematically showing one of insulating sheets according to a second preferred embodiment of the present invention.

FIG. 8 is a view schematically showing one of insulating sheets 6 according to a second preferred embodiment of the present invention. As shown in FIG. 8, each of the insulating sheets 6 is substantially C-shaped and preferably includes one longitudinal portion 61 and two transverse portions 62.

Figure 9:
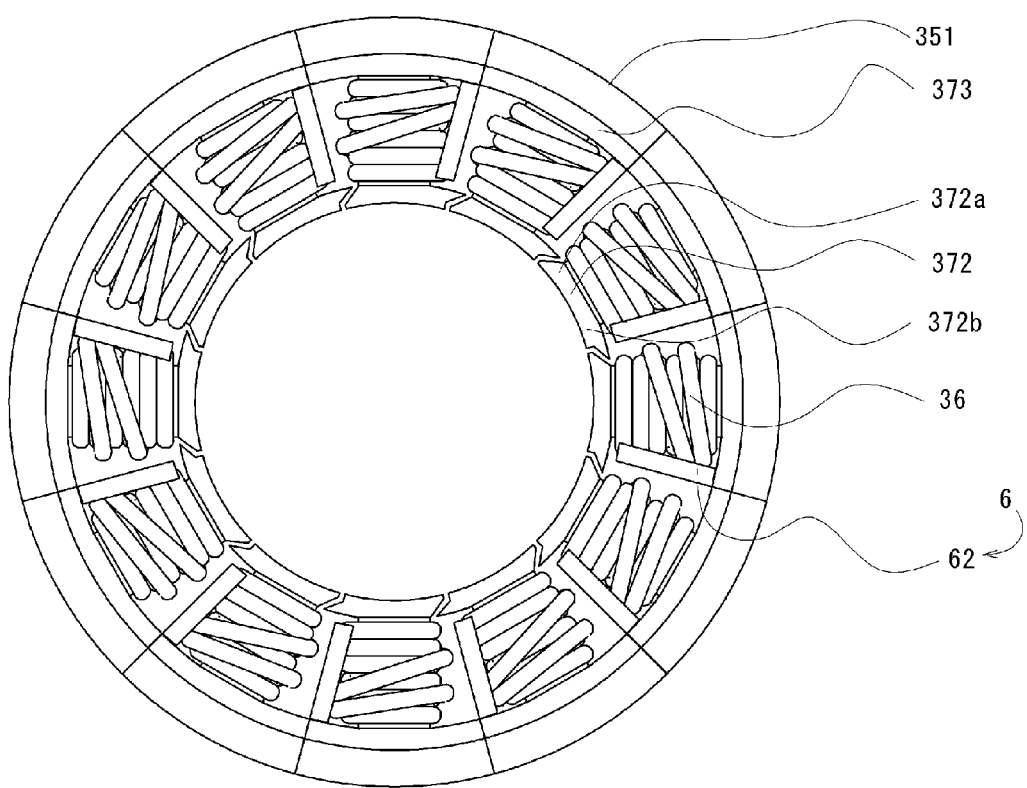
FIG. 9 is a view schematically showing the upper surface of an armature with the insulating sheets of the second preferred embodiment arranged therein.

FIG. 9 is a schematic top view showing the armature 31 with the insulating sheets 6 of the second preferred embodiment arranged therein. As shown in FIG. 9, the longitudinal portion of each of the insulating sheets 6 is arranged between the mutually-adjacent coils 36. The two transverse portions 62 of each of the insulating sheets 6 cover at least a portion of the axial opposite end areas of each of the coils 36. In this regard, the longitudinal portion 61 of each of the insulating sheets 6 is inserted into each of the slots, which means that the number of the insulating sheets 6 is preferably equal to the number of the teeth 352.

The length L of the longitudinal portion 61 of each of the insulating sheets 6 is greater than the axial dimension of the teeth 352. In other words, the opposing surfaces of the coils 36 opposed to the adjacent coils 36 face the insulating sheets 6 for the most part. Therefore, use of the insulating sheets 6 makes it possible to secure electric insulation between the mutually-adjacent coils 36.

Figure 10:
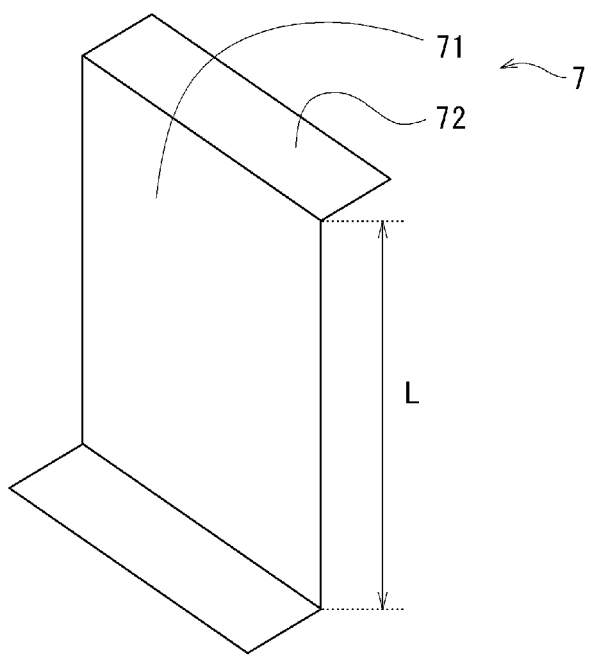
FIG. 10 is a view schematically showing one of insulating sheets according to a third preferred embodiment of the present invention.

FIG. 10 is a view schematically showing one of insulating sheets 7 according to a third preferred embodiment of the present invention. As shown in FIG. 10, each of the insulating sheets 7 is substantially S-shaped and preferably includes one longitudinal portion 71 and two transverse portions 72. The longitudinal portion 71 of each of the insulating sheets is arranged between the mutually-adjacent coils 36. The two transverse portions 72 of each of the insulating sheets 7 cover at least a portion of one axial end area of each of the coils 36 and at least a portion of the other axial end area of the adjacent coil 36.

The armature and the motor according to the present invention are not limited to the foregoing preferred embodiments but may include many other configurations.

For example, the armature core may be defined by a single integral member rather than the individually provided armature elements included in the foregoing embodiments. Moreover, the insulator members mounted to the mutually-adjacent teeth may be provided by a single member rather than separate members. Regardless of the shape of the armature core or the insulator members, the present invention can be applied to any armature that needs insulating sheets. The material of the insulating sheets 5, 6, or 7 is not particularly limited and may be any insulating material such as, for example, paper, plastic, composite, etc.

The motor according to preferred embodiments of the present invention can find its application in a vehicle-mounted motor, e.g., a motor for use in an electric power steering device, a window actuation motor, or any other desirable type of vehicle-mounted motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An armature, comprising:
    an annular core-back arranged in a concentric relationship with a center axis;
    a plurality of circumferentially spaced-apart teeth extending from the core-back toward the center axis;
    insulator members arranged to cover the teeth;
    coils including electrically conductive wires wound around the insulator members; and
    insulating sheets arranged between the coils adjacent to one another; wherein
    each of the insulator members includes a flange-shaped inner wall portion positioned radially inwards of each of the insulating sheets, the inner wall portions of the insulator members of adjacent ones of the teeth include opposing portions radially opposed to each other in a spaced-apart contactless relationship.

2. The armature of claim 1, wherein the opposing portions of the insulator members adjacent to each other have different opposing shapes at axial opposite ends of the insulator members.

3. The armature of claim 1, wherein each of the insulating sheets is curved or bent along a longitudinal direction thereof.

4. The armature of claim 1, wherein each of the insulating sheets is substantially U-shaped and includes two longitudinal portions and one transverse portion covering arranged to cover one axial end area of each of the coils.

5. The armature of claim 4, wherein a total number of the insulating sheets is equal to one half of the number of the teeth.

6. The armature of claim 4, wherein a length of the longitudinal portions of each of the insulating sheets is greater than an axial dimension of the teeth.

7. The armature of claim 1, wherein each of the insulating sheets is substantially C-shaped and includes two transverse portions and one longitudinal portion, each of the transverse portions arranged to cover at least a portion of axial end areas of each of the coils.

8. A motor comprising the armature of claim 1.

9. The motor of claim 8, further comprising a bus bar arranged to cover at least a portion of one axial end surface of each of the teeth.

* * * * *